US008595520B2

(12) United States Patent  
Li et al.

(10) Patent No.: US 8,595,520 B2
(45) Date of Patent: Nov. 26, 2013

(54) SYSTEM AND METHOD FOR DETERMINING THERMAL MANAGEMENT POLICY FROM LEAKAGE CURRENT MEASUREMENT

(75) Inventors: Qing Li, Boulder, CO (US); Jon J. Anderson, Boulder, CO (US); James M. Artmeier, Boulder, CO (US); Jeffrey A. Niemann, Boulder, CO (US); Sumit Sur, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 13/301,431

(22) Filed: Nov. 21, 2011

(65) Prior Publication Data

US 2013/0097609 A1    Apr. 18, 2013

Related U.S. Application Data

(60) Provisional application No. 61/546,210, filed on Oct. 12, 2011.

(51) Int. Cl.
*G06F 1/00* (2006.01)
*G06F 1/26* (2006.01)
*G06F 1/32* (2006.01)

(52) U.S. Cl.
USPC .......................................... 713/300; 713/320

(58) Field of Classification Search
USPC .................................. 713/300–340
See application file for complete search history.

(56) References Cited

U.S. PATENT DOCUMENTS 3,895,370 A * 7/1975 Valentini ..................... 307/104
7,062,933 B2   6/2006 Burns et al.
7,096,145 B2   8/2006 Orenstien et al.
7,363,176 B2 * 4/2008 Patel et al. .................... 702/64
7,642,764 B2 * 1/2010 Burton et al. ................ 323/283

(Continued)

FOREIGN PATENT DOCUMENTS

JP    06282364 A  * 10/1994 .............. G06F 3/00
JP    10078836 A  *  3/1998 .............. G06F 1/30

(Continued)

OTHER PUBLICATIONS

"NN85091791: Tester for Electrostatic-Discharge Faults in Integrated Circuits", Sep. 1, 1985, IBM, IBM Technical Disclosure Bulletin, vol. 28, Iss. 4, pp. 1791-1792.*

(Continued)

*Primary Examiner* — Faisal M Zaman
(74) *Attorney, Agent, or Firm* — Nicholas A. Cole (57) ABSTRACT

Various embodiments of methods and systems for determining the thermal status of processing components within a portable computing device ("PCD") by measuring leakage current on power rails associated with the components are disclosed. One such method involves measuring current on a power rail after a processing component has entered a "wait for interrupt" mode. Advantageously, because a processing component may "power down" in such a mode, any current remaining on the power rail associated with the processing component may be attributable to leakage current. Based on the measured leakage current, a thermal status of the processing component may be determined and thermal management policies consistent with the thermal status of the processing component implemented. Notably, it is an advantage of embodiments that the thermal status of a processing component within a PCD may be established without the need to leverage temperature sensors.

40 Claims, 6 Drawing Sheets

(56) References Cited

U.S. PATENT DOCUMENTS

| | | | |
|---|---|---|---|
| 7,716,006 | B2 | 5/2010 | Coskun et al. |
| 8,111,575 | B2* | 2/2012 | Mori et al. ............... 365/222 |
| 8,448,003 | B1* | 5/2013 | Rosen ...................... 713/323 |
| 2006/0076940 | A1* | 4/2006 | Kawabata ................. 323/282 |
| 2006/0248366 | A1* | 11/2006 | Schumacher et al. ...... 713/323 |
| 2007/0074011 | A1 | 3/2007 | Borkar et al. |
| 2008/0046765 | A1* | 2/2008 | Muraki ..................... 713/300 |
| 2008/0046766 | A1* | 2/2008 | Chieu et al. .............. 713/300 |
| 2009/0099705 | A1 | 4/2009 | Harris |
| 2009/0193274 | A1* | 7/2009 | Cline et al. ............... 713/320 |
| 2009/0210728 | A1* | 8/2009 | Saint-Laurent et al. ... 713/320 |
| 2009/0299543 | A1* | 12/2009 | Cox et al. ................. 700/299 |
| 2010/0083009 | A1* | 4/2010 | Rotem et al. ............. 713/320 |
| 2010/0083018 | A1* | 4/2010 | Park et al. ................ 713/320 |
| 2010/0153954 | A1* | 6/2010 | Morrow et al. ........... 718/102 |
| 2011/0093733 | A1 | 4/2011 | Kruglick |
| 2011/0099402 | A1* | 4/2011 | Zhang et al. ............. 713/323 |
| 2011/0185203 | A1* | 7/2011 | Carlson et al. ........... 713/320 |
| 2011/0314317 | A1* | 12/2011 | Gajjewar et al. .......... 713/340 |
| 2011/0320834 | A1* | 12/2011 | Ingels et al. .............. 713/310 |
| 2012/0087389 | A1* | 4/2012 | Howe et al. .............. 374/142 |

FOREIGN PATENT DOCUMENTS

| | | | | |
|---|---|---|---|---|
| JP | 11328966 | A | * 11/1999 | ........... G11C 11/409 |
| JP | 2005065044 | A | * 3/2005 | ........... H03K 19/096 |
| JP | 2009043177 | A | * 2/2009 | ................ G06F 1/26 |
| JP | 2011192685 | A | * 9/2011 | ............ H01L 21/822 |

OTHER PUBLICATIONS

"NN9409377: Low Voltage Complementary Metal Oxide Semiconductor Differential Driver", Sep. 1, 1994, IBM, IBM Technical Disclosure Bulletin, vol. 37, Iss. 9, pp. 377-380.*

Linares-Barranco, B.; Serrano-Gotarredona, T.; Serrano-Gotarredona, R.; Camunas, L.A., "On leakage current temperature characterization using sub-pico-ampere circuit techniques," Circuits and Systems, 2004. ISCAS '04. Proceedings of the 2004 International Symposium on , vol. 1, pp. I-361,I-364 vol. 1, May 23-26, 2004.*

Tahui Wang; Hsu, C.F.; Chiang, L.-P.; Zous, N.K.; Chao, T. -S; Chang, C. -Y, "Voltage scaling and temperature effects on drain leakage current degradation in a hot carrier stressed n-MOSFET," Reliability Physics Symposium Proceedings, 1998. 36th Annual. 1998 IEEE International , pp. 209,212, Mar. 31, 1998-Apr. 2, 1998.*

International Search Report and Written Opinion—PCT/US2012/055579—ISA/EPO—Dec. 11, 2012.

* cited by examiner

NORMAL THERMAL STATUS STATE — 305

- CURRENT LEAKAGE ASSOCIATED WITH PROCESSING COMPONENT INDICATES
  ACCEPTABLE THERMAL STATUS
- NO CHANGE IN THERMAL MANAGEMENT POLICY APPLIED

QUALITY OF SERVICE (QoS) STATUS STATE — 310

- CURRENT LEAKAGE ASSOCIATED WITH PROCESSING COMPONENT INDICATES
  THERMAL STATUS HAS ELEVATED FROM NORMAL STATE
  MODIFY THERMAL POLICY TO MAINTAIN HIGHEST PERFORMANCE AND LITTLE OR NO PERCEPTION IN
  QUALITY OF SERVICE TO OPERATOR OF DEVICE

SEVERE THERMAL STATUS STATE — 315

- CURRENT LEAKAGE ASSOCIATED WITH PROCESSING COMPONENT INDICATES
  THERMAL STATUS NEARING CRITICAL LEVELS
- MODIFY THERMAL POLICY TO INCLUDE ADDITIONAL THERMAL MITIGATION TECHNIQUES WITH
  PROBABLE PERCEIVABLE DEGRADATION OF PERFORMANCE BY OPERATOR OF DEVICE
- THERMAL MITIGATION MEASURES MAY INCLUDE SIGNIFICANTLY REDUCED POWER TO COMPONENT
  AND/OR EXTENSIVE REALLOCATION OF PROCESSING LOADS

CRITICAL THERMAL STATUS STATE — 320

- CURRENT LEAKAGE ASSOCIATED WITH PROCESSING COMPONENT INDICATES
  THERMAL STATUS HAS REACHED THERMAL RUNAWAY
- SHUT DOWN PROCESSING COMPONENT!!

SYSTEM AND METHOD FOR DETERMINING THERMAL MANAGEMENT POLICY FROM LEAKAGE CURRENT MEASUREMENT

CROSS-REFERENCE TO RELATED APPLICATIONS

Priority under 35 U.S.C. §119(e) is claimed to the U.S. provisional application entitled "SYSTEM AND METHOD FOR DETERMINING THERMAL MANAGEMENT POLICY FROM LEAKAGE CURRENT MEASUREMENT," filed on Oct. 12, 2011 and assigned application Ser. No. 61/546,210, the entire contents of which are hereby incorporated by reference.

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

One unique aspect of PCDs is that they typically do not have active cooling devices, like fans, which are often found in larger computing devices such as laptop and desktop computers. Instead of using fans, PCDs may rely on the spatial arrangement of electronic packaging so that two or more active and heat producing components are not positioned proximally to one another. When two or more heat producing components are suitably spaced from one another within a PCD, heat generated from the operation of each component may not negatively impact the operation of the other. Moreover, when a heat producing component within a PCD is physically isolated from other components within the device, the heat generated from the operation of the heat producing component may not negatively impact other surrounding electronics, although in some instances it may negatively impact the very component from which it was generated. Many PCDs may also rely on passive cooling devices, such as heat sinks, to manage thermal energy among the electronic components which collectively form a respective PCD.

The reality is that PCDs are typically limited in size and, therefore, room for components within a PCD often comes at a premium. As such, there typically just isn't enough space within a PCD for engineers and designers to mitigate thermal degradation or failure of processing components through the leveraging of spatial arrangements or placement of passive cooling components. Therefore, current systems and methods rely on various temperature sensors embedded on the PCD chip to monitor the dissipation of thermal energy and use the measurements to identify components that are thermal aggressors. With the heat producing components identified from the temperature measurements, current systems and methods may subsequently apply thermal management policies to reduce, or allow an increase in, thermal energy generation by an identified component.

However, because the embedded temperature sensors may be located near more than one potential thermal aggressor of the chip, it is a disadvantage of current systems and methods that specific thermal aggressors contributing to the thermal energy sensed by a temperature sensor may not be positively identifiable. Therefore, there is a need in the art for a system and method that may identify specific thermal aggressors in a PCD without having to rely on temperature readings taken by embedded temperature sensors.

SUMMARY OF THE DISCLOSURE

Various embodiments of methods and systems for determining the thermal status of processing components within a portable computing device ("PCD") by measuring leakage current on power rails uniquely associated with specific components are disclosed. Because the thermal statuses of processing components are a direct function of the leakage currents associated with the power consumption of the individual processing components within the PCD, thermal management policies that optimize PCD performance may be dictated by the thermal statuses.

One such method involves determining that the power frequency associated with a processing component of the PCD is substantially zero. In some embodiments, a state of zero power frequency may be correlated with the timing of an instruction to the processing component from a "wait for interrupt" module. Advantageously, as is understood by one of ordinary skill in the art, a processing component may "power down" upon entering a "wait for interrupt" mode, thereby establishing a condition wherein current remaining on the power rail associated with the processing component may be attributable to leakage current. The leakage current of the power rail may be measured and, based on the leakage current, a thermal status of the processing component determined. Once the thermal status is determined, thermal management policies consistent with the thermal status of the processing component may be implemented. Notably, it is an advantage of embodiments disclosed herein that the thermal status of a processing component within a PCD may be established without the need to leverage on-chip or off-chip temperature sensors.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "thermal energy generating component," "processing component" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," and "chip" are used interchangeably. Moreover, a CPU, DSP, or a chip may be comprised of one or more distinct processing components generally referred to herein as "core(s)."

In this description, it will be understood that the terms "thermal" and "thermal energy" may be used in association with a device or component capable of generating or dissipating energy that may be measured in units of "temperature." Consequently, it will further be understood that the term "temperature," with reference to some standard value, envisions any measurement that may be indicative of the relative warmth, or absence of heat, of a "thermal energy" generating device or component. For example, the "temperature" of two components is the same when the two components are in "thermal" equilibrium.

In this description, the terms "workload," "process load" and "process workload" are used interchangeably and generally directed toward the processing burden, or percentage of processing burden, associated with a given processing component in a given embodiment. Further to that which is defined above, a "processing component" or "thermal energy generating component" or "thermal aggressor" may be, but is not limited to, a central processing unit, a graphical processing unit, a core, a main core, a sub-core, a processing area, a hardware engine, etc. or any component residing within, or external to, an integrated circuit within a portable computing device. Moreover, to the extent that the terms "thermal load," "thermal distribution," "thermal signature," "thermal processing load" and the like are indicative of workload burdens that may be running on a thermal aggressor, one of ordinary skill in the art will acknowledge that use of these "thermal" terms in the present disclosure may be related to process load distributions, workload burdens and power consumption.

In this description, the terms "thermal mitigation technique(s)," "thermal policies," "thermal management policy" and "thermal mitigation measure(s) are used interchangeably.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

Current systems and methods measure temperature at various points on the chip of a PCD and use those measurements to trigger the application of thermal management policies. Consequently, the success or failure of the applied thermal management policies is logically determined by a follow-up measure of temperature at the various points. The presumption is that if the follow-up temperature measurements are in an acceptable range then the one or more components associated with the temperature measurements must be operating under safe conditions.

The approach of measuring temperature to determine the thermal status of a specific component within a PCD is subject to many shortcomings. For instance, temperature sensors inherently measure temperature at a single point on the chip, not on a given component within the chip and, therefore, the measured temperature may not accurately represent the thermal status of the component with which it is associated. Further, because temperature measurements may only indicate the level of thermal energy dissipation at a particular point on the chip, the measured thermal energy is often the result of a collective effort by more than one thermal aggressor within the PCD. Notably, such is a disadvantage for efficient application of thermal management policies on specific components because each component within a PCD has a unique thermal status, independent of other thermal aggressors that may be contributing to the measurement.

One of ordinary skill in the art will recognize that, by using temperature measurements as indicators of component health, current systems and methods are monitoring a condition that is actually just a symptom of the real condition sought to be managed. To ensure the ongoing health and efficiency of a component within a PCD, such as a processing component, the real condition to manage is the production of leakage current which, in excess, may lead to thermal runaway of the associated component. As such, it is the leakage current associated with a given component that is the more direct indicator of the component's thermal status.

Advantageously, embodiments of the systems and methods disclosed herein leverage leakage current measurements, which are a direct function of a component's operating temperature, such as a core for example, to deduce the thermal status of the given component within a PCD. Essentially, certain embodiments take advantage of conditions within a PCD that call for the removal of power supplied on a dedicated rail to a given processing component. One such condition may be the initiation of a "wait for interrupt" ("WFI") instruction to a processing component when its workload queue is empty. Notably, when a processing core enters a WFI mode, its processor clock is stopped, or "gated off," until an interrupt or debug event occurs. While the processor clock is stopped, the core frequency necessarily goes to zero and the core ceases to draw current from its power supply rail. Advantageously, during such an event, the only measurable current remaining on the power supply rail of the processing component may be its associated leakage current.

Embodiments target the initiation of WFI instructions, or similar events, as opportunities for measuring isolated leakage currents on power rails associated with specific processing components. The leakage current measurements may then be compared with leakage current rates known to correlate with thermal status conditions of the given processing component, thereby accurately deducing the actual thermal status of the processing component without having to rely on nearby temperature measurements. With the thermal status of a processing component accurately determined, the most efficient thermal management policies may be selected and applied in such a manner that the quality of service ("QoS") provided by the PCD is optimized.

Moreover, one of ordinary skill in the art will recognize that, by directly monitoring leakage current instead of heat dissipated as a result of leakage current, the lag time from a spike in leakage current to the time that heat generated from the spike is sensed by a nearby temperature sensor may be avoided. Advantageously, therefore, by deducing thermal status of a core, for example, from a leakage current measurement, as opposed to a nearby temperature measurement, embodiments of the disclosed systems and methods may more quickly respond to adverse thermal conditions through proactive management of thermal policies.

Figure 1:
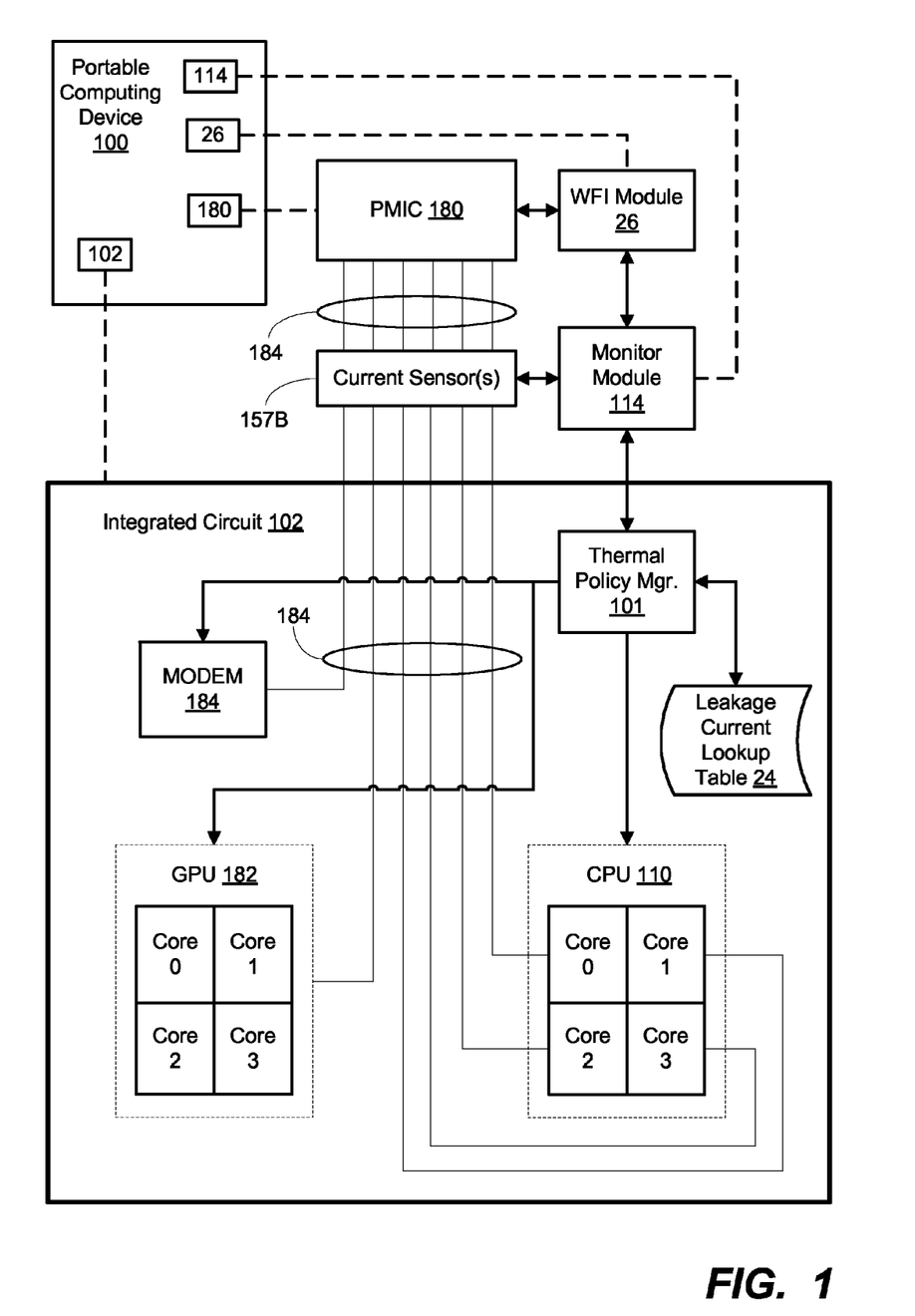
FIG. 1 is a functional block diagram illustrating an exemplary embodiment of an on-chip system for determining the thermal status of a processing component in a portable computing device ("PCD") by monitoring leakage currents.

FIG. 1 is a functional block diagram illustrating an exemplary embodiment of an on-chip system 102 for determining the thermal status of a processing component in a portable computing device ("PCD") 100 by monitoring leakage currents. The on-chip system 102 may subsequently leverage the thermal status of the various processing components to apply one or more thermal management policies. Advantageously, by determining the specific thermal status of a given processing component, embodiments may apply thermal mitigation measures using a fine grained approach which targets specific processing components. Consequently, the quality of service ("QoS") experienced by the user of a PCD may be optimized as only the components identified as thermal aggressors are subject to mitigation measures that may affect performance.

As can be seen in the exemplary illustration of FIG. 1, a power management integrated circuit ("PMIC") 180 is configured to supply power to each of one or more exemplary processing components 110, 182, 186 residing within the on-chip system 102. As depicted, the power is supplied by the PMIC 180 to each of the processing components 110, 182, 186 via a number of dedicated power rails 184. Notably, in the FIG. 1 illustration, modem 186 and graphical processing unit ("GPU") 182 are each depicted as having a single, associated power supply rail 184 while each of cores 0, 1, 2 and 3 of central processing unit ("CPU") 110 are depicted as having a dedicated power rail 184. Even so, one of ordinary skill in the art will recognize that any core, sub-core, sub-unit or the like within a processing component, such as components 110, 182, 186, may share a common power rail with complimentary components or have a dedicated power rail 184 and, as such, the particular architecture illustrated in FIG. 1 is exemplary in nature and will not limit the scope of the disclosure.

Returning to the FIG. 1 illustration, one or more current sensors 157B are configured to monitor power rails 184 and generate a signal indicative of current levels within the power rails 184. It is envisioned that the current sensors 157B may be of a Hall effect type for measuring the electromagnetic field generated by current flowing through the power rail 184, a shunt resistor current measurement type for calculating current from voltage drop measured across a resistor in the power rail 184, or any type known to one of ordinary skill in the art. As such, while the particular design, type or configuration of a current sensor 157B that may be used in an embodiment of the systems and methods may be novel in, and of, itself, the systems and methods are not limited to any particular type of current sensor 157B.

A monitor module 114 may monitor and receive the signals generated by the current sensor(s) 157B. The monitor module 114 may also monitor the status of instructions generated by a WFI module 26. Notably, although the monitor module 114, current sensors 157B and WFI module 26 are depicted in the FIG. 1 illustration as residing off of the chip 102, one of ordinary skill in the art will recognize that any or all of components 26, 114 and 157B may reside on chip 102 in certain embodiments. Moreover, one of ordinary skill in the art will recognize that, in some embodiments of a PCD 100, the monitor module 114 and/or current sensors 157B may be included in the PMIC 180, although the particular embodiment illustrated in FIG. 1 depicts the monitor module 114 and current sensors 157B as independent components.

The WFI module 26, as generally described above, may be configured to track scheduled workloads for various processing components 110, 182, 186 and issue "wait for interrupt" instructions when no workloads are queued for a certain processing component. The "wait for interrupt" instructions may cause a processing component 110, 182, 186 to temporarily power down into an idle state, thereby reducing its power frequency to zero and ceasing to unnecessarily consume power. As one of ordinary skill in the art will recognize, embodiments of the WFI module 26 may include hardware and/or software interrupts handled by an interrupt service routine. That is, depending on the embodiment, a WFI module 26 may be implemented in hardware as a distinct system with control outputs, such as an interrupt controller circuit, or implemented in software, such as firmware integrated into a memory subsystem. In some embodiments, callback hookups coinciding with the timing of a component's entry and exit into the idle state, as dictated by the WFI module 26 interrupts, may be recognized by the monitor module 114 and used as triggers for leakage current sampling/measurement on one or more of the power rails 184. Even so, it will be understood that embodiments of the system and method are not limited to the use of callback hookups as triggers for the timing of current measurements on the rails 184. Further, and more generally, it will be understood that embodiments of the system and method are not limited to the use of triggers associated with "wait for interrupt" logic. As such, the embodiments described herein to leverage triggers associated with "wait for interrupt" systems and methods are exemplary in nature and are not meant to limit the scope of a WFI module 26. To this end, reference to the WFI module 26 envisions any hardware and/or software in a PCD 100 that can be leveraged to determine opportunistic timing for current sampling on one or more of the power rails 184.

Returning to the FIG. 1 illustration, the monitor module 114, recognizing that WFI module 26 has issued an instruction, monitors a signal from one or more current sensors 157B after the WFI instruction has been initiated by a processing component. Advantageously, because the processing component is not drawing current for processing a workload during the WFI period, the only measurable current on the power rail 184 monitored by the monitoring module 114 may be attributable to leakage current. The monitor module 114 may subsequently communicate with a thermal policy manager ("TPM") module 101 to relay the leakage current level associated with one or more processing components 110, 182, 184 or, in some embodiments, the monitor module 114 may reference a leakage current lookup ("LCL") table and relay a thermal status indicator to the TPM module 101.

In some embodiments, the TPM module 101 may reference the LCL table 24 for determining the thermal status of the given processing components. Once the thermal status of the processing component is recognized by the TPM module 101, thermal management policies for increasing future workloads, reducing future workloads, clocking frequencies, reducing power consumption or the like may be applied to the processing component.

As a non-limiting example, WFI module 26 may initiate a "wait for interrupt" instruction to core 0 of CPU 110. The monitor module 114 may recognize that the instruction has been initiated and leverage a current sensor 157B to detect a current level measurement on the power rail 157B dedicated to core 0 of CPU 110. Because core 0 of CPU 110 will have temporarily powered down as a result of receiving the WFI instruction, the measured current on the power rail 157B associated with core 0 of CPU 110 may be substantially, if not purely, attributable to leakage current. The leakage current measurement may then be leveraged by the monitor module 114 and TPM module 101 to determine the thermal state of core 0 of CPU 110 by querying the LCL table 24. Once the thermal status of core 0 of CPU 110 is recognized by the TPM module 101, thermal mitigation or management policies for controlling thermal energy generation by core 0 of CPU 110 may be efficiently implemented.

Notably, in some embodiments, the data in the LCL table 24 may be empirically collected based on temperatures previously measured in association with known leakage current levels. In other embodiments, the data in the LCL table 24 may have been calculated on an a-priori basis. Regardless of how the data within an LCL table 24 may have been derived or collected, one of ordinary skill in the art will recognize that embodiments of an LCL table 24 may be queried for mapping a measured leakage current to a thermal status of a processing component associated with the leakage current and, beyond such function, are not limiting on the scope of the systems and embodiments disclosed.

Returning to the exemplary scenario outlined above wherein the leakage current associated with core 0 of CPU 110 is measured in conjunction with issuance of a WFI instruction, a non-limiting example of a thermal management policy that may be implemented by a TPM module 101 as a result of the measurement may include the LCL table 24 being leveraged by the TPM module 101 to analyze and compare the thermal status of core 0 with that of core 3. Suppose, for example, that the thermal status of core 0 qualifies it as a "thermal aggressors," i.e. a processing component that is dissipating excessive amounts of thermal energy relative to core 3. In such a scenario, core 0 may be in a position to compromise user experience of PCD 100 or become otherwise detrimental to the functionality of PCD 100. Notably, as thermal energy dissipation may be increased when processing loads are concentrated in core 0, thereby potentially impacting PCD 100 performance and/or user experience, thermal energy generation may be mitigated with minimal impact on QoS by the TPM 101 reallocating scheduled workload to complimentary core 3. In this example, the TPM module 101 may further leverage the leakage current measurements via query of LCL table 24 to not only identify thermal aggressors, but also identify underutilized processing resources that are candidates for receipt of workloads that may be reallocated from selected thermal aggressors.

The reallocation of workload from a thermal aggressor to a relatively underutilized processing component may be an aspect of a thermal mitigation technique implemented by TPM 101. Notably, however, reallocation of workload is just one example of a thermal management policy that may be implemented by a TPM module 101 as a result of the thermal status of a processing component being determined through leakage current monitoring and, as such, one of ordinary skill in the art will recognize that the systems and methods disclosed herein are not limited in scope by the particular thermal management policy initiated. For example, when a thermal status threshold is recognized from a leakage current measurement taken by a sensor 157B, the TPM 101 may improve the PCD 100 performance and user experience by "steering" or reallocating all or a portion of the processing load from a thermal aggressor associated with the measured power rail 184 to an alternative, underutilized processing component associated with a different power rail 184 having a lower leakage current measurement. In some embodiments, the TPM 101 may simply "clock" the processing speed of the thermal aggressor without causing an across the board wilting of the entire CPU 110, thereby maintaining a higher QoS level by powering down only the identified thermal aggressor. In still other embodiments, the TPM 101 may select a proximate component to the thermal aggressor and completely power it down in an effort to leverage it as a heat sink for drawing thermal energy away from the thermal aggressor. In other embodiments, the TPM 101 may cause an identified thermal aggressor to enter into a cycle of high processing speeds followed by forced power collapses for cooling off periods. In yet other embodiments, the TPM 101 may reallocate workloads within a thermal aggressor from a high power density sub-core area to a lower power density main core area. In other embodiments, the TPM 101 may modify the use of external, off-chip thermal generators known to be proximally located to the identified thermal aggressor. In other embodiments, the TPM 101 may cause the power supplied to a thermal aggressor to be reduced, thereby mitigating the thermal energy generated by the thermal aggressor at the expense of processing efficiency. Notably, therefore, while the specific thermal mitigation technique(s) that may be employed by a given embodiment may be novel, in and of, themselves, the particular thermal mitigation technique(s) leveraged by any given embodiment on a targeted thermal aggressor will not limit the scope of the disclosure.

Figure 2:
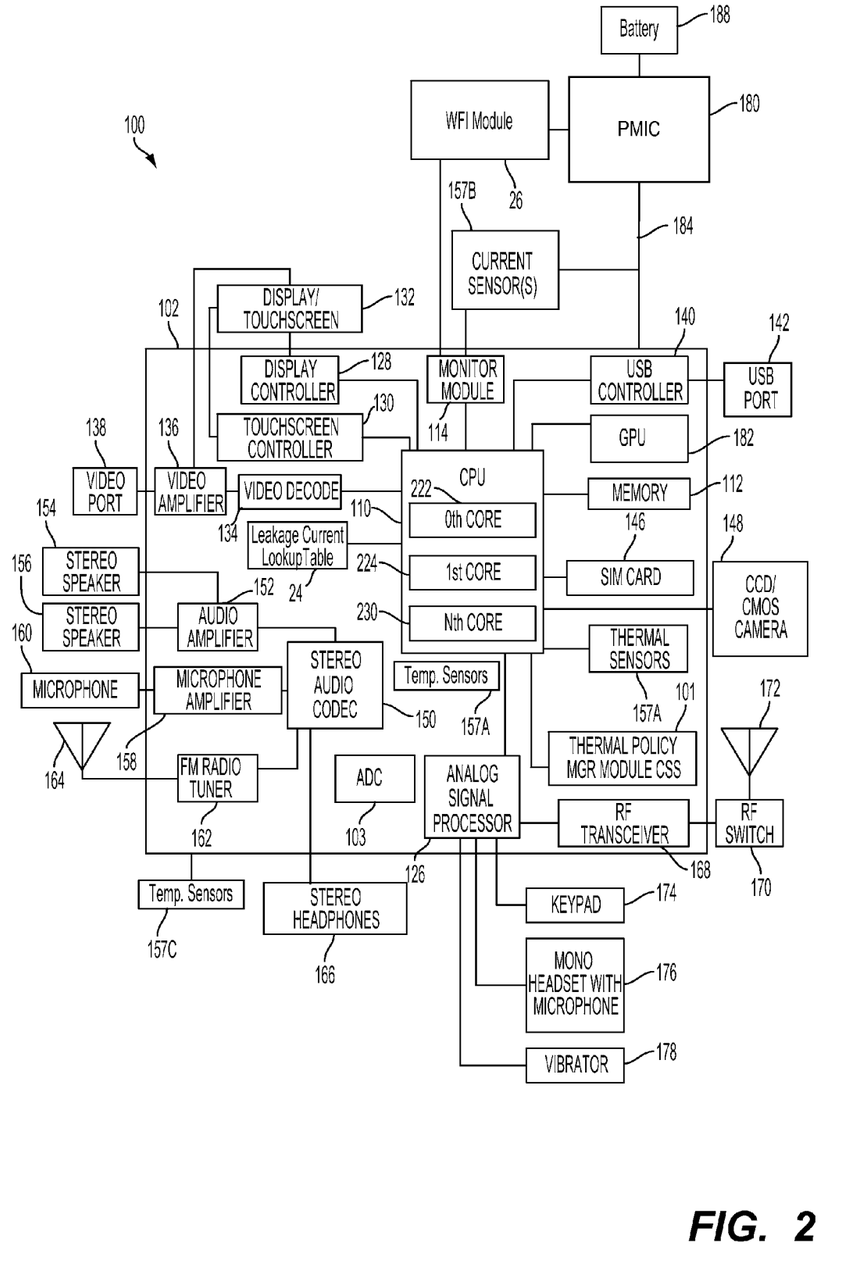
FIG. 2 is a functional block diagram illustrating an exemplary embodiment of the PCD of FIG. 1.

FIG. 2 is a functional block diagram of an exemplary, non-limiting aspect of a PCD 100 in the form of a wireless telephone for implementing methods and systems for monitoring leakage currents, identifying thermal states of processing components associated with the monitored leakage currents and leveraging the identified thermal states to drive thermal management policies. As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art.

In general, the TPM module(s) 101 may be responsible for monitoring and applying thermal policies that include one or more thermal mitigation techniques that may help a PCD 100 manage thermal conditions and/or thermal loads and avoid experiencing adverse thermal conditions, such as, for example, reaching critical temperatures, while maintaining a high level of functionality.

FIG. 2 also shows that the PCD 100 may include a monitor module 114. The monitor module 114 communicates with multiple operational sensors (e.g., thermal sensors 157A) distributed throughout the on-chip system 102 and with the CPU 110 of the PCD 100 as well as with the TPM module 101. In some embodiments, monitor module 114 may also monitor current sensors 157B for leakage currents uniquely associated with the cores 222, 224, 230 and transmit the leakage current data to the TPM module 101. The TPM module 101 may work with the monitor module 114 to identify adverse thermal conditions that may warrant application of one or more thermal mitigation techniques to identified thermal aggressors within chip 102.

As illustrated in FIG. 2, a display controller 128 and a touch screen controller 130 are coupled to the digital signal processor 110. A touch screen display 132 external to the on-chip system 102 is coupled to the display controller 128 and the touch screen controller 130. A WFI module 26 may monitor workload queues for the cores 222, 224, 230 and work with PMIC 180 to manage power provided to the cores. The monitor module 114 may recognize the actions of WFI module 26 for the purpose of triggering leakage current measurements on power rails from the PMIC 180 to components of the on-chip system 102.

PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core central processing unit ("CPU") 110. A video amplifier 136 is coupled to the video encoder 134 and the touch screen display 132. A video port 138 is coupled to the video amplifier 136. As depicted in FIG. 2, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 2, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 2, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 2 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 2 further indicates that a radio frequency ("RF") transceiver 168 may be coupled to the analog signal processor 126. An RF switch 170 may be coupled to the RF transceiver 168 and an RF antenna 172. As shown in FIG. 2, a keypad 174 may be coupled to the analog signal processor 126. Also, a mono headset with a microphone 176 may be coupled to the analog signal processor 126. Further, a vibrator device 178 may be coupled to the analog signal processor 126. FIG. 2 also shows that a power supply 188, for example a battery, is coupled to the on-chip system 102 through PMIC 180. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157C. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157C may comprise one or more thermistors. The thermal sensors 157A, 157C may produce a voltage drop that is converted to digital signals with an analog-to-digital converter ("ADC") controller 103. However, other types of thermal sensors 157A, 157C may be employed without departing from the scope of the invention.

The thermal sensors 157A, 157C, in addition to being controlled and monitored by an ADC controller 103, may also be controlled and monitored by one or more TPM module(s) 101. The TPM module(s) 101 may comprise software which is executed by the CPU 110. However, the TPM module(s) 101 may also be formed from hardware and/or firmware without departing from the scope of the invention. The TPM module(s) 101 may be responsible for monitoring and applying thermal policies that include one or more thermal management techniques that may help a PCD 100 avoid critical temperatures while maintaining a high level of functionality.

Returning to FIG. 2, the touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, the power supply 188, the PMIC 180 and the thermal sensors 157C are external to the on-chip system 102. However, it should be understood that the monitor module 114 may also receive one or more indications or signals from one or more of these external devices by way of the analog signal processor 126 and the CPU 110 to aid in the real time management of the resources operable on the PCD 100.

In a particular aspect, one or more of the method steps described herein may be implemented by executable instructions and parameters stored in the memory 112 that form the one or more TPM module(s) 101. These instructions that form the TPM module(s) 101 may be executed by the CPU 110, the analog signal processor 126, or another processor, in addition to the ADC controller 103 to perform the methods described herein. Further, the processors 110, 126, the memory 112, the instructions stored therein, or a combination thereof may serve as a means for performing one or more of the method steps described herein.

Figure 3:
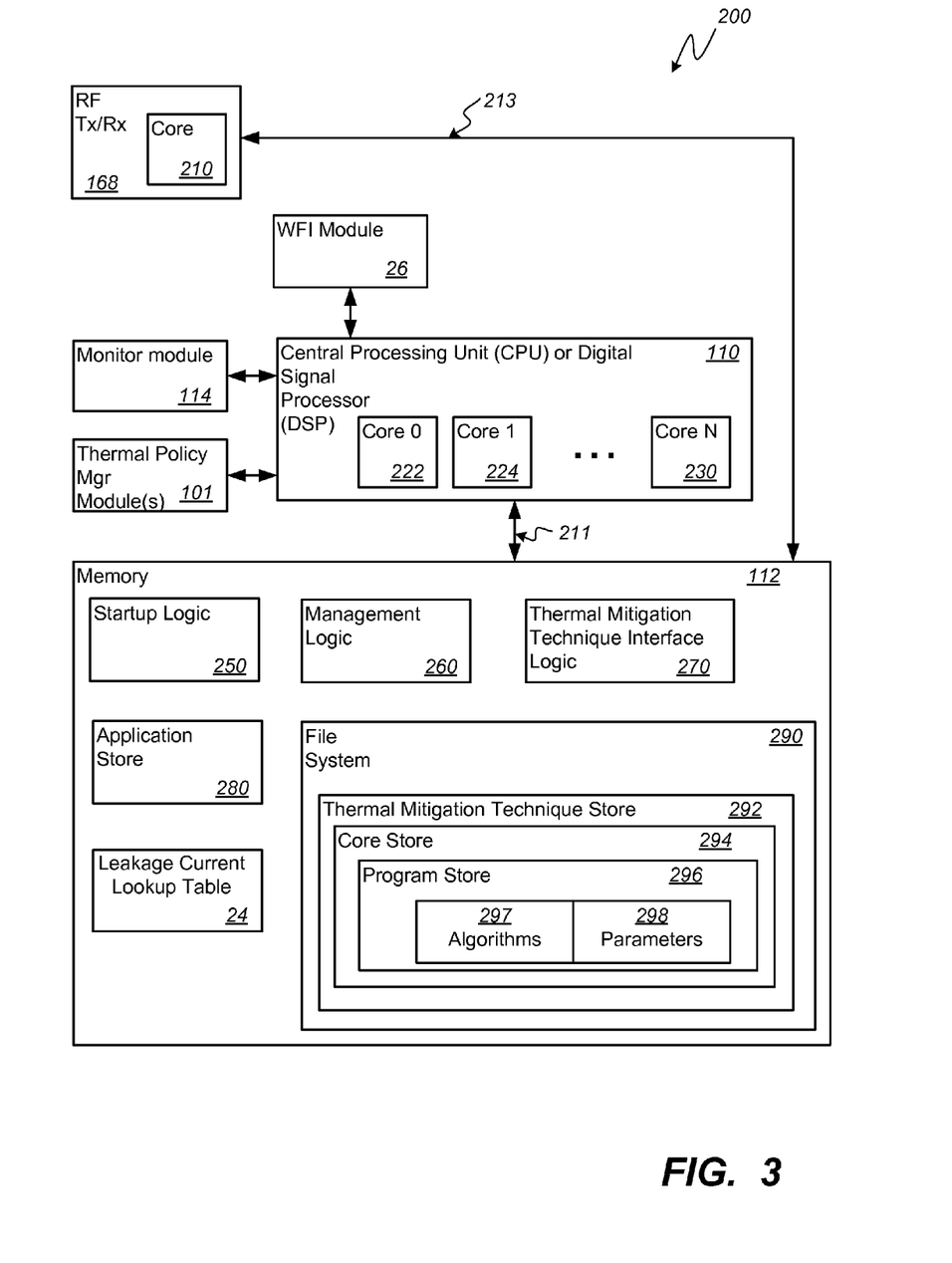
FIG. 3 is a schematic diagram illustrating an exemplary software architecture of the PCD of FIG. 2 for supporting identification of thermal aggressors through current leakage monitoring and application of algorithms associated with thermal management techniques.

FIG. 3 is a schematic diagram illustrating an exemplary software architecture of the PCD 100 of FIG. 2 for supporting identification of thermal aggressors through current leakage monitoring and application of algorithms associated with thermal management techniques. Any number of algorithms may form or be part of at least one thermal management technique that may be applied by the thermal policy manager 101 when certain thermal conditions are met and thermal aggressors identified via associated leakage currents.

As illustrated in FIG. 3, the CPU or digital signal processor 110 is coupled to the memory 112 via a bus 211. The CPU 110, as noted above, is a multiple-core processor having N core processors. That is, the CPU 110 includes a first core 222, a second core 224, and an $N^{th}$ core 230. As is known to one of ordinary skill in the art, each of the first core 222, the second core 224 and the $N^{th}$ core 230 are available for supporting a dedicated application or program. Alternatively, one or more applications or programs may be distributed for processing across two or more of the available cores.

The CPU 110 may receive commands from the TPM module(s) 101 that may comprise software and/or hardware. If embodied as software, the TPM module 101 comprises instructions that are executed by the CPU 110 that issues commands to other application programs being executed by the CPU 110 and other processors.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

In the illustrated embodiment, the RF transceiver 168 is implemented via digital circuit elements and includes at least one processor such as the core processor 210 (labeled "Core"). In this digital implementation, the RF transceiver 168 is coupled to the memory 112 via bus 213.

Each of the bus 211 and the bus 213 may include multiple communication paths via one or more wired or wireless connections, as is known in the art. The bus 211 and the bus 213 may have additional elements, which are omitted for simplicity, such as controllers, buffers (caches), drivers, repeaters, and receivers, to enable communications. Further, the bus 211 and the bus 213 may include address, control, and/or data connections to enable appropriate communications among the aforementioned components.

When the logic used by the PCD 100 is implemented in software, as is shown in FIG. 3, it should be noted that one or more of startup logic 250, management logic 260, thermal mitigation technique interface logic 270, applications in application store 280, data associated with LCL table 24 and portions of the file system 290 may be stored on any computer-readable medium for use by or in connection with any computer-related system or method.

In the context of this document, a computer-readable medium is an electronic, magnetic, optical, or other physical device or means that may contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that may fetch the instructions from the instruction execution system, apparatus, or device and execute the instructions. In the context of this document, a "computer-readable medium" may be any means that can store, communicate, propagate, or transport the program for use by or in connection with the instruction execution system, apparatus, or device.

The computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program may be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the thermal mitigation technique interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor and or the core 210 (or additional processor cores) in the RF transceiver 168.

In one exemplary embodiment for driving thermal management policies from leakage current measurements associated with processing components, the startup logic 250 includes one or more executable instructions for selectively identifying, loading, and executing a select program for managing or controlling the performance of one or more of the available cores such as the first core 222, the second core 224 through to the $N^{th}$ core 230. A select program may be found in the program store 296 of the embedded file system 290 and is defined by a specific combination of a performance scaling algorithm 297 and a set of parameters 298. The select program, when executed by one or more of the core processors in the CPU 110 and the core 210 in the RF transceiver 168, may operate in accordance with one or more signals provided by the monitor module 114 in combination with control signals provided by the one or more TPM module(s) 101 to scale the performance of the respective processor core. In this regard, the monitor module 114 may provide one or more indicators of events, processes, applications, resource status conditions, elapsed time, as well as temperature as received from the TPM module 101.

The management logic 260 includes one or more executable instructions for terminating a thermal management program on one or more of the respective processor cores, as well as selectively identifying, loading, and executing a more suitable replacement program for managing or controlling the performance of one or more of the available cores based on an updated thermal status identified from a leakage current measurement. The management logic 260 is arranged to perform these functions at run time or while the PCD 100 is powered and in use by an operator of the device. A replacement program may be found in the program store 296 of the embedded file system 290 and is defined by a specific combination of a performance scaling algorithm 297 and a set of parameters 298.

The replacement program, when executed by one or more of the core processors in the digital signal processor or the core 210 in the RF transceiver 168, may operate in accordance with one or more signals provided by the monitor module 114 or one or more signals provided on the respective control inputs of the various processor cores to scale the performance of the respective processor core. In this regard, the monitor module 114 may provide one or more indicators of events, processes, applications, resource status conditions, elapsed time, temperature, current leakage, etc in response to control signals originating from the TPM 101.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the management logic 260 that instructs the PCD 100 to suspend all performance scaling in the RF transceiver 168 when the received signal power falls below an identified threshold. By way of further example, the inputs may include a change to the management logic 260 that instructs the PCD 100 to apply a desired program when the video codec 134 is active.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280, data in the LCL table 24 or information in the embedded file system 290 may be edited, replaced, or otherwise modified. In some embodiments, the interface logic 270 may permit an end user or operator of the PCD 100 to search, locate, modify or replace the startup logic 250, the management logic 260, applications in the application store 280, data in the LCL table 24 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged thermal mitigation technique store 292. In this regard, the file system 290 may include a reserved section of its total file system capacity for the storage of information for the configuration and management of the various parameters 298 and thermal mitigation algorithms 297 used by the PCD 100. As shown in FIG. 3, the store 292 includes a core store 294, which includes a program store 296, which includes one or more thermal mitigation programs.

Figure 4:
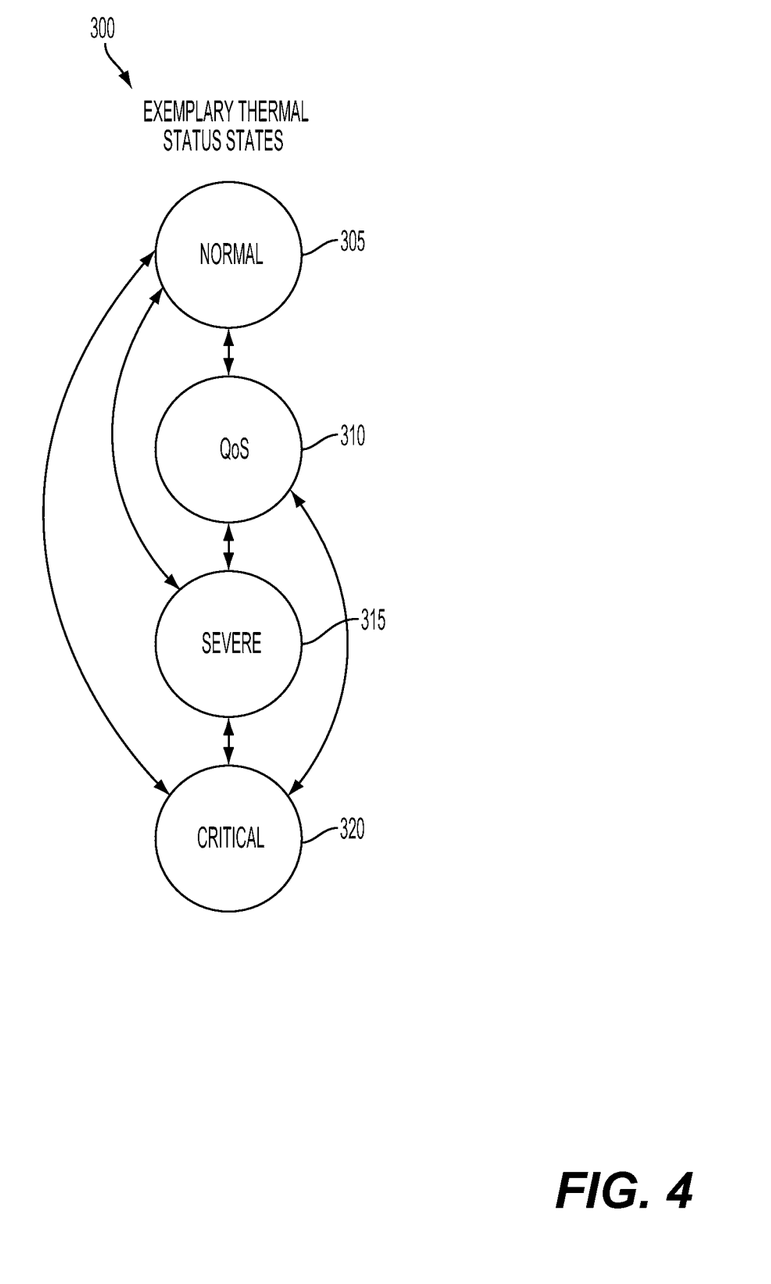
FIG. 4 is an exemplary state diagram that illustrates various thermal status states that may be associated with the leakage current level of a processing component of a PCD.

FIG. 4 is an exemplary state diagram 300 that illustrates various thermal status states 305, 310, 315, and 320 that may be associated with the leakage current level of a processing component of a PCD 100 and recognized by the TPM module 101. The first thermal status state 305 may comprise a "normal" state in which the thermal management policy of the TPM 101 remains unchanged. In this exemplary first and normal state 305, the particular processing component associated with a leakage current level is usually not in any danger or risk of reaching critical temperatures that may cause failure or severe degradation. In this exemplary state, the processing component may have an actual thermal status that includes temperatures which are at 50° C. or below. However, one of ordinary skill in the art will recognize that other temperature ranges may be established for the first and normal state 305 without departing from the scope of the invention.

The second thermal status state 310 may comprise a "quality of service" or "QoS" state in which the TPM module 101 may modify its thermal management policy relative to one or more processing components of the PCD 100. This exemplary second state 310 may be reached or entered into by the TPM module 101 when a change of leakage current levels has been detected in association with a processing component previously mapped to the first, normal state 305. The threshold or magnitude of the change in leakage current which triggers this QoS state 310 may be adjusted or tailored according to a particular processing component within a PCD 100. Therefore, while a given processing component of a PCD 100 may be operating in the first normal state 305, depending upon the magnitude of the change in leakage current that is detected by one or more current sensors 157B, the processing component may leave the first normal state 305 and enter into the second QoS state 310 as recognized by the TPM module 101 after query of the LCL table 24.

For example, a processing component such as GPU 182 may have a first maximum thermal status of approximately 40° C. associated with a leakage current reading from a given current sensor 157B. And a second reading from the same current sensor 157B may indicate a change in thermal status equivalent to only 5° C. which takes the maximum thermal status to 45° C. However, while the maximum thermal status recognized may be below an established threshold of 50° C. for the first, normal state 305, the change in associated thermal status by 5° C. may be significant enough for the TPM module 101 to change the state to the second, QoS state 310.

Figure 5:
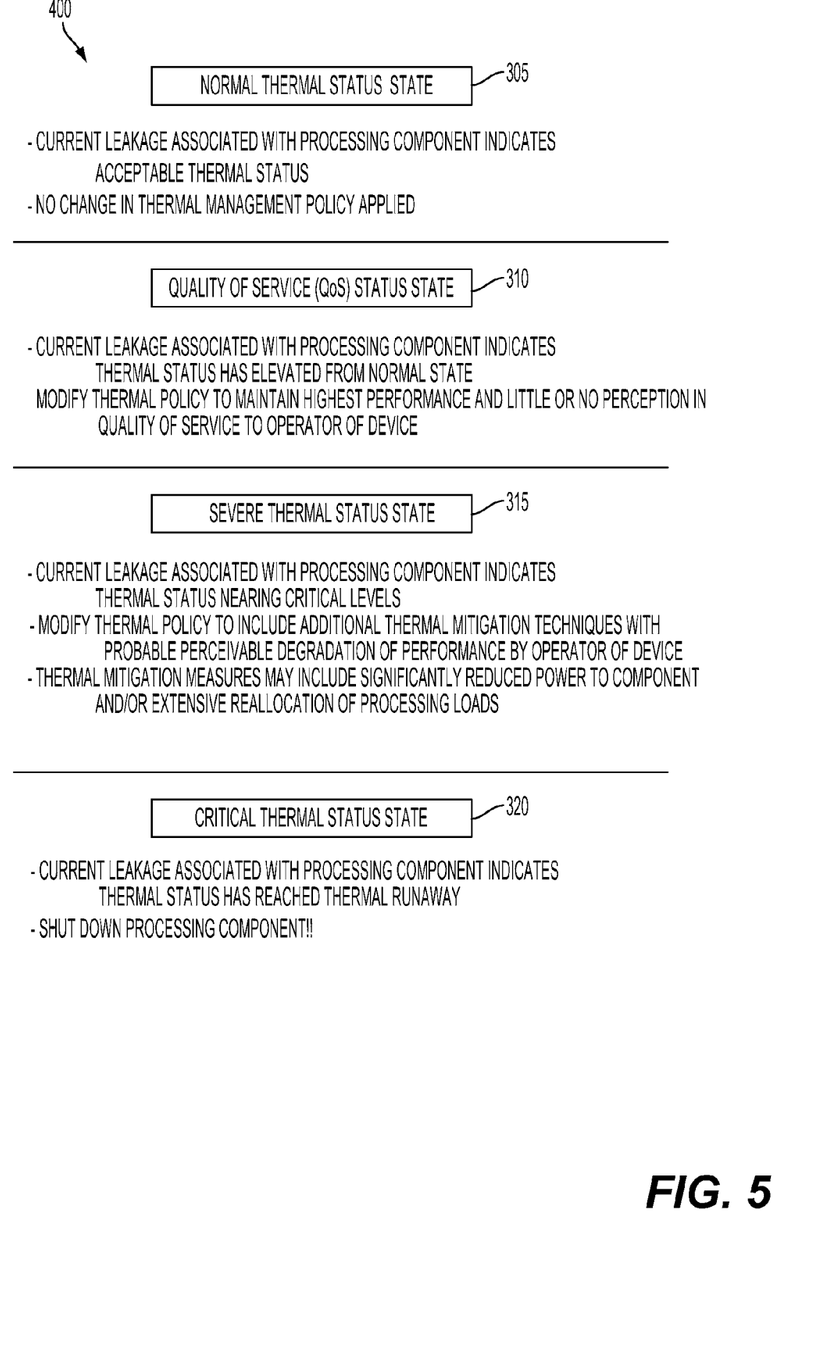
FIG. 5 is a diagram illustrating exemplary thermal mitigation techniques that may be applied or ordered by the thermal policy manager and are dependent upon a particular thermal status state of a component within a PCD.

In the second, QoS thermal state 310 the TPM 101 module may request or it may actually perform one or more thermal mitigation techniques in order to reduce the thermal load and temperature of the PCD 100. In this particular state 310, the TPM module 101 is designed to implement or request thermal mitigation techniques that may be barely perceivable by an operator and which may degrade a quality of service provided by the PCD 100 in a minimal fashion. The temperature range for this second, QoS thermal state 310 may comprise a range between about 50° C. to about 80° C. One of ordinary skill in the art will recognize that other temperature ranges may be established for the second QoS state 305 and are within the scope of the invention.

As noted previously, the second, QoS state 310 may be triggered based on the magnitude of the change in leakage current and is not necessarily limited to the endpoints of a selected temperature range that may be documented in an LCL table 24. Further details about this second, QoS thermal state 310 will be described below in connection with FIG. 5.

The third thermal state 315 may comprise a "severe" state in which the TPM module 101 requests and/or applies more aggressive thermal mitigation techniques relative to the second, QoS state 310 described above. This means that in this state the TPM module 101 is less concerned about quality of service from the perspective of the operator. In this thermal state, the TPM module 101 is more concerned about mitigating or reducing thermal load in order to decrease temperature of the PCD 100, as indicated by a measured leakage current associated with a component of the PCD 100. In this third thermal status state 315, a processing component of a PCD 100 may have degradations in performance that are readily perceived or observed by an operator. The third, severe thermal status state 315 and its corresponding thermal mitigation techniques applied or triggered by the TPM module 101 will be described in further detail below in connection with FIG. 5. The temperature range for this third, severe thermal status state 310 may comprise a range between about 80° C. to about 100° C.

Similar to the first thermal status state 305 and second thermal status state 310 as discussed above, this third and severe thermal status state 315 may be initiated based upon the change in leakage current detected by a current sensor 157B and not necessarily limited to the endpoints of a selected temperature range that may be documented in an LCL table 24. For example, as the arrows in this diagram illustrate, each thermal status state may be initiated in sequence or they may be initiated out of sequence depending upon the magnitude of the change in leakage current that may be detected. So this means that the processing component of PCD 100 may leave the first and normal thermal state 305 and enter into or initiate the third and severe thermal state 315 based on a change in leakage current that is detected by a current sensors 157B, and vice versa. Similarly, the PCD 100 may be in the second or QoS thermal status state 310 and enter into or initiate the fourth or critical state 320 based on a change in leakage current that is detected by a current sensor 157, and vice versa. In this exemplary third and critical state 320, the TPM module 101 may be applying or triggering as many and as sizable thermal mitigation techniques as possible in order to avoid reaching one or more critical levels of current leakage that may result in temperatures that cause permanent damage to the processing component contained within the PCD 100.

This fourth and critical thermal status state 320 may be similar to conventional techniques that are designed to eliminate functionality and operation of a PCD 100 in order to avoid critical temperatures. The fourth thermal state 320 may comprise a "critical" state in which the TPM module 101 applies or triggers the shutting down of non-essential hardware and/or software. The temperature range for this fourth thermal state may include those of about 100° C. and above. The fourth and critical thermal state 320 will be described in further detail below in connection with FIG. 5.

The thermal policy management system is not limited to the four thermal status states 305, 310, 315, and 320 illustrated in FIG. 4. Depending upon a particular PCD 100, or processing component within a PCD 100, additional or fewer thermal status states may be provided without departing from the scope of the invention. That is, one of ordinary skill in the art will recognize that additional thermal status states may improve functionality and operation of a particular PCD 100 while in other situations fewer thermal status states may be preferred for a particular PCD 100 that has its own unique hardware and/or software.

FIG. 5 is a diagram illustrating exemplary thermal mitigation techniques that may be applied or ordered by the TPM module 101 and are dependent upon a particular thermal status state of a component within a PCD 100. It should be appreciated that the thermal mitigation techniques described herein may be applied to manage thermal loads associated with any type of processing, but may be particularly useful in situations involving graphics processing due to inherent power demands, system requirements, and importance to the overall user experience of the PCD 100. As noted previously, in this first thermal status state 305, a processing component of a PCD 100 may not be in any danger or risk of reaching a critical temperature that may degrade its functionality. Usually, in this first thermal status state, the TPM module 101 is not applying or has not requested any initiation of thermal mitigation techniques such that the processing component of the PCD 100 is operating at its fullest potential and highest performance without regard to thermal energy generation.

In the second thermal status state 310, also referred to as the QoS state 310, once it is initiated, the TPM module 101 may initiate or request the monitor module to start applying thermal mitigation techniques but with the objective to maintain high-performance with little or no perception in degradations to the quality of service as perceived by the operator of the PCD 100. According to this exemplary second thermal status state 310 illustrated in FIG. 5, the TPM module 101 may request the monitor 114 to initiate thermal mitigation techniques such as, but not limited to, (1) load scaling and/or (2) load dynamic scaling; (3) spatial load shifting; and (4) process load reallocation. Load scaling may comprise adjusting or "scaling" the maximum clock frequency allowed in DVFS algorithm, as is understood by one of ordinary skill in the art. Such an adjustment may limit the maximum heat dissipation.

Referring now to the third thermal status state 315 of FIG. 5, also known as the severe thermal status state 315, the TPM module 101 may apply or request more aggressive thermal mitigation techniques and/or additional thermal mitigation techniques (relative to the second thermal state 310) with probable perceivable degradation of performance observed by an operator of the PCD 100. According to this exemplary thermal status state 315, the TPM module 101 may cause reduction in power to one or more processing components like GPU 182 and or cores of CPU 110. The TPM module 101 may also shift workloads among different hardware devices in a spatial manner in order to bring active devices off-line and to bring inactive devices on-line. The thermal mitigation techniques of this third and severe thermal state 315 may be the same as those described above with respect to the second, quality of service thermal state 310. However, these same thermal mitigation techniques may be applied in a more aggressive manner.

Referring now to the fourth and critical thermal status state 320 of FIG. 5, the TPM module 101 may start shutting down or requesting the monitor 114 to start shutting down all non-essential hardware and/or software modules. "Nonessential" hardware and/or software modules may be different for each type of particular PCD 100. According to one exemplary embodiment, all nonessential hardware and/or software modules may include all of those outside of an emergency 911 telephone call function and global positioning satellite ("GPS") functions. This means that the TPM module 101 in this fourth, critical thermal state 320 may cause the shutdown of thermal aggressors that do not affect emergency 911 telephone calls and GPS functionality. The TPM module 101 may shut down modules in sequence and/or in parallel depending upon the critical temperatures being monitored by the leakage current sensors 157B and the change in the leakage current rates being observed by the TPM module 101. The temperature range for this fourth thermal status state 320 may include those of about 100° C. and above.

Figure 6:
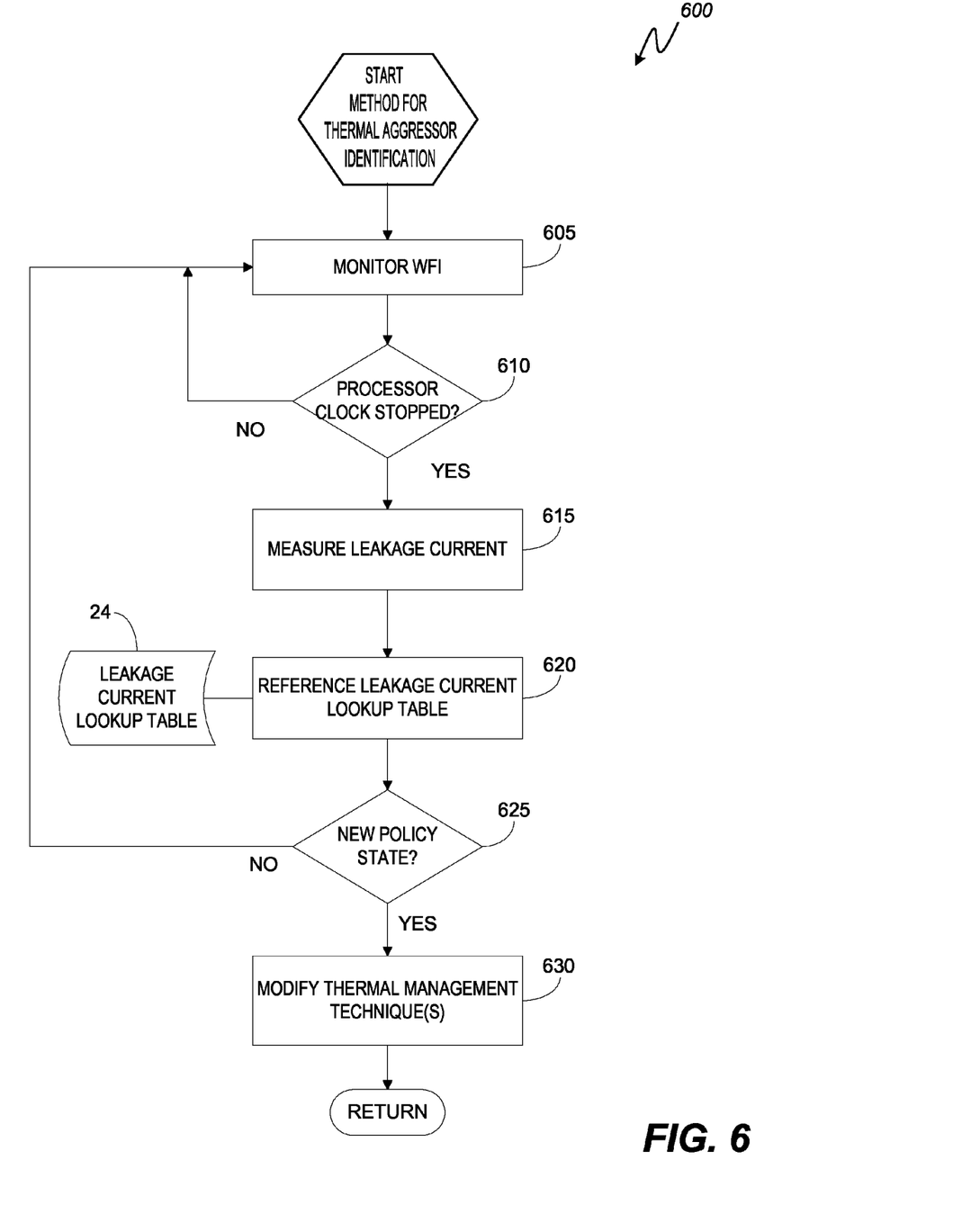
FIG. 6 is a logical flowchart illustrating a method for identifying and selecting thermal aggressors by leveraging leakage current measurements associated with one or more processing components within a PCD.

FIG. 6 is a logical flowchart illustrating a method 600 for identifying and selecting thermal aggressors by leveraging leakage current measurements associated with one or more processing components within a PCD 100. Method 600 of FIG. 6 starts with a first block 605 in which the monitor module 114 may track the actions of WFI module 26 in an effort to recognize the initiation of instructions for a processing component to power down. Notably, when a processing component powers down as a result of receiving a "wait for interrupt" instruction from WFI module 26, the clock speed of the processing component may be taken to a zero frequency. Consequently, at decision block 610, it may be directly verified that the given processor clock has stopped or, in some embodiments, the processor clock may be presumed stopped as a result of recognizing the instruction transmitted from the WFI module 26. In either case, if the processor has not powered down, then the "no" branch is followed from decision block 610 back to block 605. If the processor has, in fact, powered down, then any current remaining on the power rail 184 associated with the given processing component may be attributable to leakage current. In such an event, the "yes" branch is followed to block 615 and the leakage current is measured.

Once the leakage current is measured at block 615, a leakage current lookup table 24 may be queried at block 620 and the thermal status of the processing component that is associated with the measured leakage current may be determined. If the thermal status of the processing component, as queried from the LCL table 24, indicates that no change in thermal policy is warranted, then the "no" branch is followed from decision block 625 back to block 605 and the WFI module 26 is monitored for a subsequent opportunity to measure leakage current in isolation on a power rail 184. If the thermal status of the processing component indicates that a change in thermal policy is warranted, then at block 630 a new or modified thermal management policy, which may include a thermal mitigation technique, is selected and implemented. The process returns to block 605.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", "subsequently", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for mitigating thermal degradation in a portable computing device ("PCD"), the method comprising:
   determining with an element separate from a processing component that a power frequency associated with the processing component positioned within the PCD is substantially zero, wherein current remaining on a power rail associated with the processing component may correspond to a presence of a leakage current, the processing component comprising a computer processor;
   measuring the leakage current on the power rail associated with the processing component;
   based on the measured leakage current, determining a thermal status of the processing component; and
   based on the thermal status of the processing component, enacting thermal management policies to prevent thermal degradation of the processing component.

2. The method of claim 1, wherein determining that the power frequency associated with a processing component positioned within the PCD is substantially zero further comprises recognizing that a "wait for interrupt" instruction has been given to the processing component.

3. The method of claim 1, wherein the leakage current is measured by a sensor that monitors an electromagnetic field around the power rail.

4. The method of claim 1, wherein the thermal status of the processing component is determined by querying a leakage current lookup table that contains data associating thermal statuses with ranges of leakage current levels.

5. The method of claim 1, wherein enacting the thermal management policies further comprises electing to leave current thermal management policies in place.

6. The method of claim 1, wherein enacting the thermal management policies further comprises modifying the current thermal management policies based on the thermal status of the processing component.

7. The method of claim 6, wherein the modified management policies comprise reallocation of queued workloads from the processing component to a second processing component.

8. The method of claim 6, wherein the modified management policies comprise reducing the clock speed of the processing component.

9. The method of claim 1, wherein the processing component is a graphical processing unit.

10. The method of claim 1, wherein the processing component is a core within a multi-core processor.

11. A computer system for mitigating thermal degradation in a portable computing device ("PCD"), the system comprising:
    a monitor module separate from a processing component operable to:
    determine that a power frequency associated with the processing component positioned within the PCD is substantially zero, wherein current remaining on a power rail associated with the processing component may correspond to a presence of a leakage current, the processing component comprising a computer processor; and measure the leakage current on the power rail associated with the processing component; and a thermal policy manager ("TPM") module operable to:
based on the measured leakage current, determine a thermal status of the processing component; and
based on the thermal status of the processing component, enacting thermal management policies to prevent thermal degradation of the processing component.

12. The computer system of claim 11, further comprising a "wait for interrupt" ("WFI") module operable to initiate instructions that cause the processing component to power down and wherein the monitor module is further operable to recognize that a "wait for interrupt" instruction has been given to the processing component from the WFI module.

13. The computer system of claim 11, wherein the leakage current is measured by a sensor that monitors an electromagnetic field around the power rail.

14. The computer system of claim 11, wherein the TPM module is further operable to determine the thermal status of the processing component by querying a leakage current lookup table that contains data associating thermal statuses with ranges of leakage current levels.

15. The computer system of claim 11, wherein the TPM module is further operable to elect to leave current thermal management policies in place.

16. The computer system of claim 11, wherein the TPM module is further operable to modify the current thermal management policies based on the thermal status of the processing component.

17. The computer system of claim 16, wherein the TPM module is further operable to cause queued workloads to be reallocated from the processing component to a second processing component.

18. The computer system of claim 16, wherein the TPM module is further operable to cause the clock speed of the processing component to be reduced.

19. The computer system of claim 11, wherein the processing component is a graphical processing unit.

20. The computer system of claim 11, wherein the processing component is a core within a multi-core processor.

21. A computer system for mitigating thermal degradation in a portable computing device, the system comprising:
means for determining that a power frequency associated with a processing component positioned within the PCD is substantially zero, wherein current remaining on a power rail associated with the processing component may correspond to a presence of a leakage current and the means for determining being separate from the processing component, the processing component comprising a computer processor;
means for measuring the leakage current on the power rail associated with the processing component;
means for determining a thermal status of the processing component based on the measured leakage current; and
means for enacting thermal management policies to prevent thermal degradation of the processing component based on the thermal status of the processing component.

22. The computer system of claim 21, wherein the means for determining that the power frequency associated with a processing component positioned within the PCD is substantially zero further comprises means for recognizing that a "wait for interrupt" instruction has been given to the processing component.

23. The computer system of claim 21, wherein the leakage current is measured by a means for monitoring an electromagnetic field around the power rail.

24. The computer system of claim 21, wherein the thermal status of the processing component is determined by a means for querying a leakage current lookup table that contains data associating thermal statuses with ranges of leakage current levels.

25. The computer system of claim 21, wherein the means for enacting the thermal management policies further comprises means for electing to leave current thermal management policies in place.

26. The computer system of claim 21, wherein the means for enacting the thermal management policies further comprises means for modifying the current thermal management policies based on the thermal status of the processing component.

27. The computer system of claim 26, wherein the means for modifying management policies comprises means for reallocating queued workloads from the processing component to a second processing component.

28. The computer system of claim 26, wherein the means for modifying management policies comprises means for reducing the clock speed of the processing component.

29. The computer system of claim 21, wherein the processing component is a graphical processing unit.

30. The computer system of claim 21, wherein the processing component is a core within a multi-core processor.

31. A computer program product comprising a computer usable medium having a computer readable program code embodied therein, said computer readable program code adapted to be executed to implement a method for mitigating thermal degradation in a portable computing device, said method comprising:
determining with an element separate from a processing component that a power frequency associated with a processing component positioned within the PCD is substantially zero, wherein current remaining on a power rail associated with the processing component may correspond to a presence of a leakage current, the processing component comprising a computer processor;
measuring the leakage current on the power rail associated with the processing component;
based on the measured leakage current, determining a thermal status of the processing component; and
based on the thermal status of the processing component, enacting thermal management policies to prevent thermal degradation of the processing component.

32. The computer program product of claim 31, wherein determining that the power frequency associated with a processing component positioned within the PCD is substantially zero further comprises recognizing that a "wait for interrupt" instruction has been given to the processing component.

33. The method of claim 31, wherein the leakage current is measured by a sensor that monitors an electromagnetic field around the power rail.

34. The method of claim 31, wherein the thermal status of the processing component is determined by querying a leakage current lookup table that contains data associating thermal statuses with ranges of leakage current levels.

35. The method of claim 31, wherein enacting the thermal management policies further comprises electing to leave current thermal management policies in place.

36. The method of claim 31, wherein enacting the thermal management policies further comprises modifying the current thermal management policies based on the thermal status of the processing component.

37. The method of claim 36, wherein the modified management policies comprise reallocation of queued workloads from the processing component to a second processing component.

38. The method of claim 36, wherein the modified management policies comprise reducing the clock speed of the processing component.

39. The method of claim 31, wherein the processing component is a graphical processing unit.

40. The method of claim 31, wherein the processing component is a core within a multi-core processor.

* * * * *